United States Patent
Kang (10) Patent No.: US 7,168,647 B1
(45) Date of Patent: Jan. 30, 2007

(54) FLY REEL DRAG MECHANISM

(75) Inventor: Young Kang, Columbia, SC (US)

(73) Assignee: Shakespeare Company, LLC, Columbia, SC (US)

( * ) Notice: Subject to any disclaimer, the term of this patent is extended or adjusted under 35 U.S.C. 154(b) by 0 days.

(21) Appl. No.: 11/376,058

(22) Filed: Mar. 15, 2006

(51) Int. Cl.
*A01K 89/016* (2006.01)
*A01K 89/033* (2006.01)

(52) U.S. Cl. ............... 242/303; 242/295; 242/306; 242/318

(58) Field of Classification Search .......... 242/295, 242/298, 302, 303, 317, 318, 321, 246, 247
See application file for complete search history.

(56) References Cited

U.S. PATENT DOCUMENTS

| | | | |
|---|---|---|---|
| 3,958,771 A * | 5/1976 | Everett et al. ............ | 242/303 |
| 3,989,204 A | 11/1976 | Lémery | |
| 4,168,041 A | 9/1979 | Moosberg | |
| 4,352,474 A | 10/1982 | Kovalovsky | |
| 4,515,325 A * | 5/1985 | Ito ....................... | 242/295 |
| 4,527,753 A | 7/1985 | Jones | |
| 4,553,714 A | 11/1985 | Humble | |
| 4,685,632 A | 8/1987 | Yeh | |
| 4,703,902 A | 11/1987 | Prouza et al. | |
| 5,407,144 A | 4/1995 | Ryall | |
| 5,482,221 A | 1/1996 | Peterson et al. | |
| 5,556,049 A | 9/1996 | Bennett et al. | |
| 5,615,840 A * | 4/1997 | Bushnell et al. ......... | 242/301 |
| 5,626,303 A | 5/1997 | Bringsen | |
| 5,752,667 A | 5/1998 | Merrill et al. | |
| 5,915,639 A | 6/1999 | Farris | |
| 5,921,492 A * | 7/1999 | Bauer ..................... | 242/317 |
| 5,992,580 A | 11/1999 | MacKenzie | |
| 6,053,445 A | 4/2000 | Farris | |
| 6,065,699 A | 5/2000 | Sacconi | |
| 6,073,871 A | 6/2000 | Farris et al. | |
| 6,193,182 B1 | 2/2001 | Capra | |
| 6,209,815 B1 | 4/2001 | Collier | |
| 6,267,312 B1 | 7/2001 | Farris et al. | |

(Continued)

*Primary Examiner*—Emmanuel Marcelo
*Assistant Examiner*—Evan H. Langdon
(74) *Attorney, Agent, or Firm*—Nelson Mullins Riley & Scarborough LLP (57) ABSTRACT

A fishing reel including a housing having a central hub and a main shaft having a proximal end and a distal end, the main shaft being non-rotatably fixed to the central hub at its proximal end. A spool having a central recess is releasably secured to the main shaft distal end and a one-way clutch having a central bore is non-rotatably received in the central recess. The reel also includes a drag assembly with a drag housing having a drag surface and a central aperture, the drag housing being fixed to the central hub of the housing such that a drag cavity is formed therebetween. A sleeve extends along the main shaft and has a first portion received in the central bore of the one-way clutch and a second portion extending into the drag cavity. A first drag washer is disposed in the drag cavity and non-rotatably fixed to the second portion of the sleeve and a drag knob is rotatably secured to the housing. Rotation of the drag knob in a first direction urges the drag washer axially along the sleeve toward the drag surface and increases rotational frictional force on the first drag washer. Rotation of the drag knob in a second direction reduces rotational frictional force exerted on said first drag washer.

29 Claims, 6 Drawing Sheets

U.S. PATENT DOCUMENTS

| | | | |
|---|---|---|---|
| 6,286,772 B1 * | 9/2001 | Koelewyn | 242/246 |
| 6,296,200 B1 | 10/2001 | Chang | |
| 6,382,544 B1 | 5/2002 | Park | |
| 6,550,709 B2 | 4/2003 | Vashro | |
| 7,077,350 B2 * | 7/2006 | Koelewyn | 242/295 |

* cited by examiner

FLY REEL DRAG MECHANISM

TECHNICAL FIELD

The present invention relates generally to fishing reels. More particularly, the present invention relates to a drag assembly for a fly fishing reel.

BACKGROUND OF THE INVENTION

Existing fly fishing reels typically have a spool rotatably mounted to a shaft extending outwardly from a central portion of a reel housing. The spool includes a winding drum that allows fishing line to be either paid out or reeled in dependent upon the direction of rotation of the spool about the main shaft of the fishing reel. At times, it is desirable to increase the force required to pay out fishing line, such as when a fish has been hooked, which is commonly referred to as increasing the amount of "drag" on the reel. The desired amount of force required to pay out the fishing line may vary based on a number of factors, such as the weight of the fish on the line. Existing reels often include mechanisms that allow the user of the fishing reel to vary the force required to pay out line as desired.

Typically, these drag mechanisms include multiple, intricate components that are often exposed to environmental parameters, such as water, salt, etc. Exposure to such elements over time can lead to the degradation of the individual components, thereby causing reduced performance of the fishing reel. In addition, these mechanisms frequently operate on the concept of increasing friction between the intricate components, thereby increasing the drag force exerted on the spool. Increased friction between the intricate elements can also lead to wear of the components, and ultimately degrade the performance of the fishing reel. Thus, while prior art approaches have worked reasonably well, further room for improvement exists in the art.

SUMMARY OF THE INVENTION

The present invention recognizes and addresses the foregoing considerations, and others, of prior art constructions and methods.

One embodiment of the present invention provides a fishing reel including a housing having a central hub and a main shaft having a proximal end and a distal end, the main shaft being non-rotatably fixed to the central hub at its proximal end. A spool having a central recess is releasably secured to the main shaft distal end and a one-way clutch having a central bore is non-rotatably received in the central recess. The reel also includes a drag assembly with a drag housing having a drag surface and a central aperture, the drag housing being fixed to the central hub of the housing such that a drag cavity is formed therebetween. A sleeve extends along the main shaft and has a first portion received in the central bore of the one-way clutch and a second portion extending into the drag cavity. A first drag washer is disposed in the drag cavity and non-rotatably fixed to the second portion of the sleeve and a drag knob is rotatably secured to the housing. Rotation of the drag knob in a first direction urges the drag washer axially along the sleeve toward the drag surface and increases rotational frictional force on the first drag washer. Rotation of the drag knob in a second direction reduces rotational frictional force exerted on the first drag washer.

Another embodiment of the present invention provides a fishing reel including a housing having a central hub and a main shaft having a proximal end and a distal end, the main shaft being non-rotatably fixed to the central hub at the proximal end. A spool is rotatable about the main shaft and releasably secured to the main shaft distal end. A drag housing has a drag surface and a central aperture and is fixed to the central hub of the housing such that a drag cavity is formed therebetween. A sleeve extends along the main shaft and has a first end adjacent the distal end of the main shaft and a second end extending into the drag cavity adjacent to the central hub. A first bearing assembly is disposed between the first end of the sleeve and the distal end of the main shaft and a second bearing assembly is disposed between the second end of the sleeve and the central hub of the housing. A first drag washer is disposed in the drag cavity and is non-rotatably fixed to the sleeve. A drag knob is rotatably secured to the housing such that rotation of the drag knob in a first direction urges the drag washer axially along the sleeve and increases rotational frictional force between the first drag washer and the drag surface of the drag housing. Rotation of the drag knob in a second direction reduces the frictional force exerted on the first drag washer.

Other objects, features and aspects for the present invention are discussed in greater detail below. The accompanying drawings are incorporated in and constitute a part of this specification, and illustrate one or more embodiments of the invention. These drawings, together with the description, serve to explain the principals of the invention.

BRIEF DESCRIPTION OF THE DRAWINGS

A full and enabling disclosure of the present invention, including the best mode thereof, to one of ordinary skill in the art, is set forth more particularly in the remainder of this specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the discussion herein is a description of exemplary embodiments only, and is not intended as limiting of the broader aspects of the present invention, which broader aspects are embodied in the exemplary constructions.

Figure 1A:
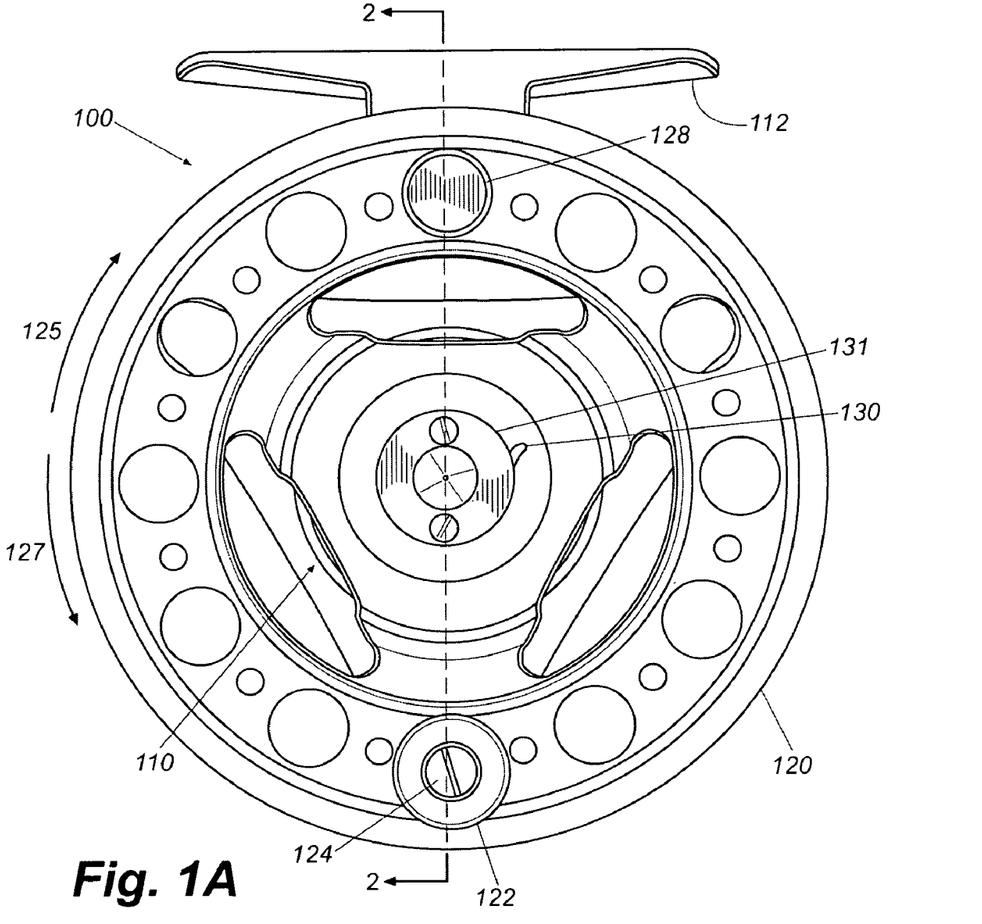
FIGS. 1A and 1B are left and right elevational views, respectfully, of a fishing reel in accordance when an embodiment of the present invention.
Figure 1B:
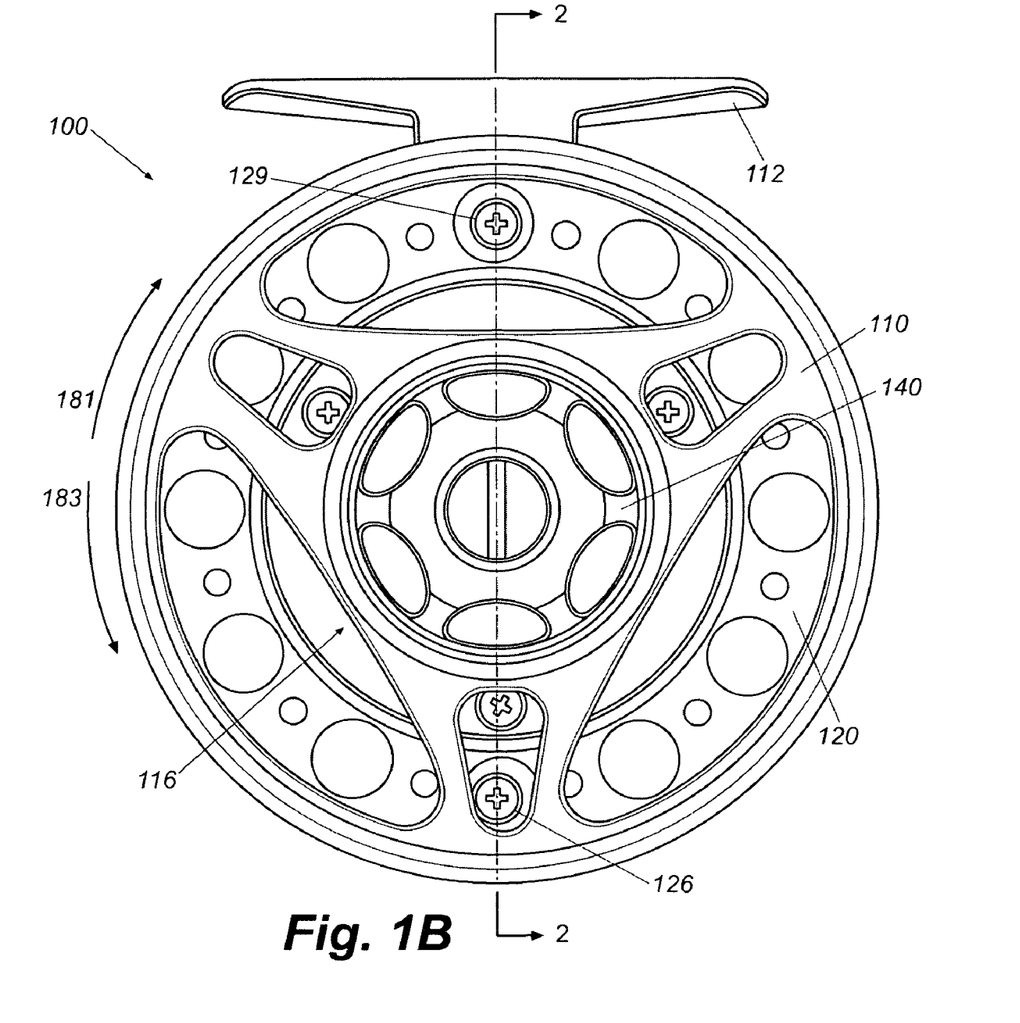

FIGS. 1A and 1B illustrate a fishing reel 100 constructed in accordance with the present invention. Fishing reel 100 includes a housing 110 and a spool 120. Housing 110 rotatably supports spool 120 and includes a reel foot 112 for attaching fishing reel 100 to a fishing rod (not shown). As shown in FIG. 1B, housing 110 further includes a central hub 116 that rotatably receives a drag knob 140. Drag knob 140 is used to selectively adjust the amount of force required to unwind fishing-line (not shown) from spool 120. This is commonly referred to as adjusting the "drag" of a fishing reel, as discussed in greater detail below.

Figure 2:
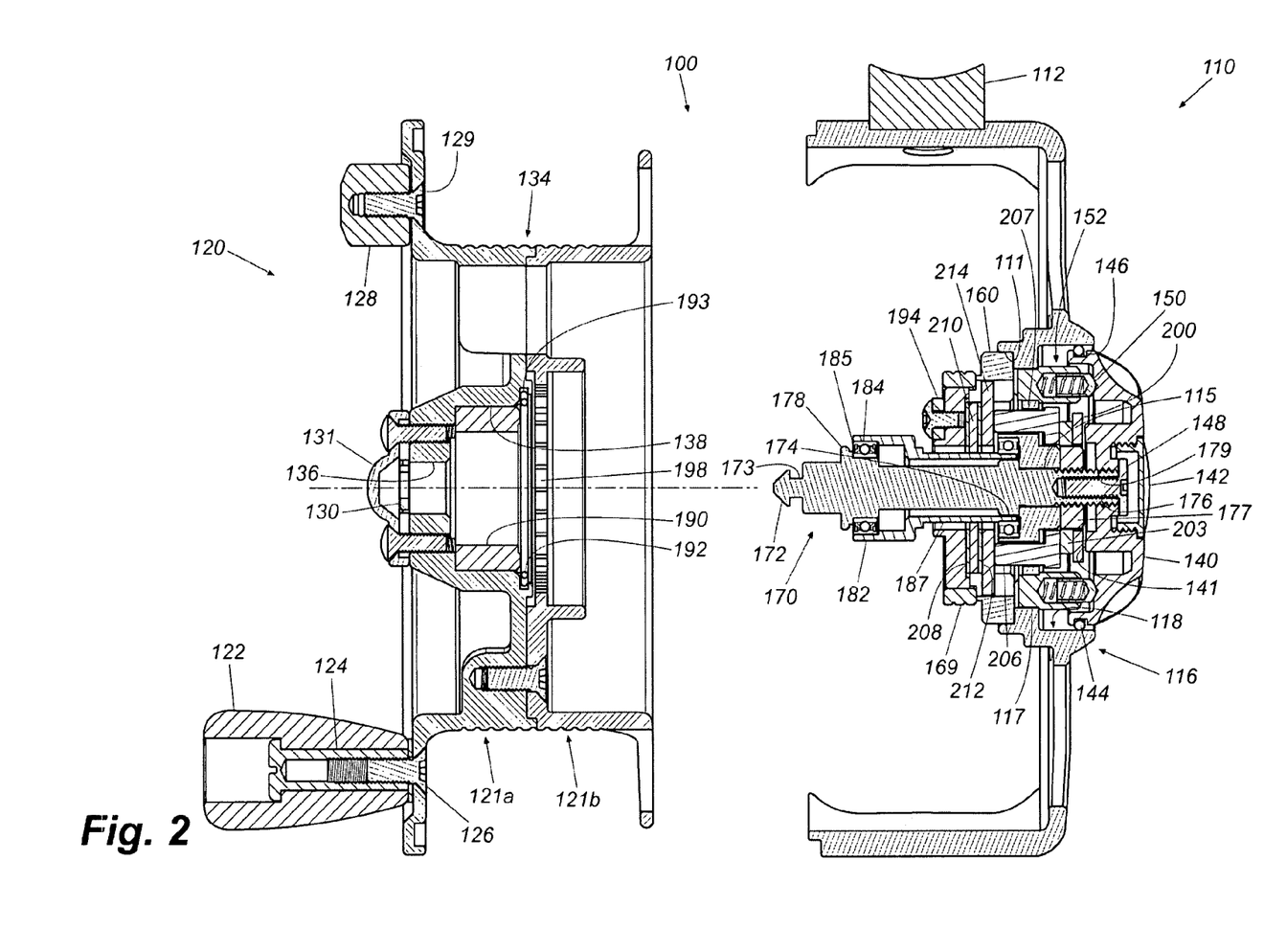
FIG. 2 is an exploded cross-sectional view of the fishing reel shown in FIGS. 1A and 1B, taken along line 2—2.

Referring now also to FIG. 2, spool 120 includes a handle knob 122, a spool balancer 128, and an assembly pin 130. Handle knob 122 is rotatably secured to the outer periphery of spool 120 with a knob pin 124 and a knob screw 126. This configuration permits handle knob 122 to rotate about knob pin 124 as a user rotates spool 120 within housing 110. Spool balancer 128 is secured to the outer periphery of spool 120 opposite handle knob 122 by a balancer screw 129 and offsets the weight of handle knob 122. Assembly pin 130 allows a user to selectively secure the spool 120 to housing 110.

Figure 3:
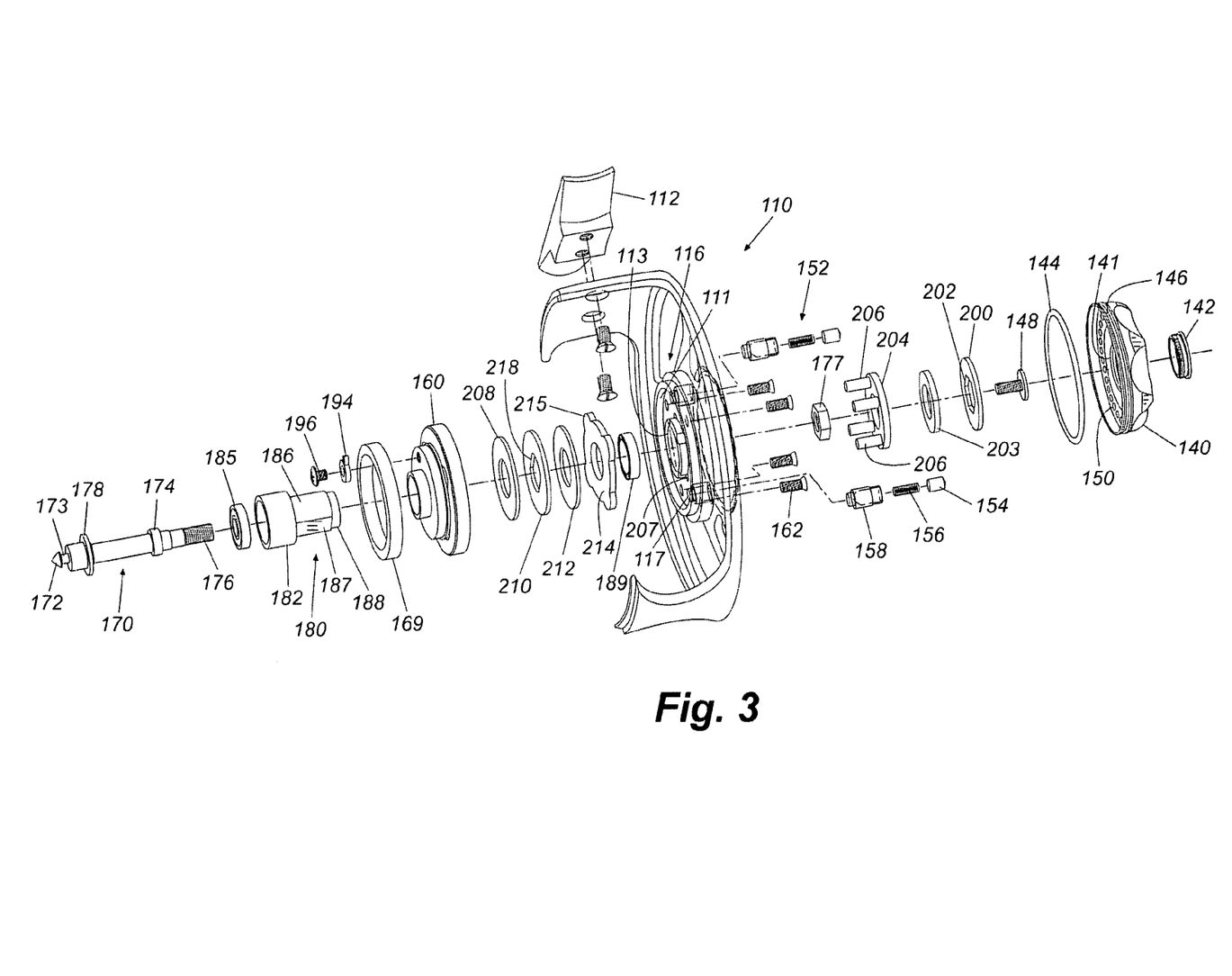
FIG. 3 is an exploded perspective view of the reel housing of the fishing reel shown in FIGS. 1A and 1B.

As shown in FIGS. 2 and 3, housing 110 includes a main shaft 170 extending inwardly from central hub 116. A first end 176 of main shaft 170 is threaded and extends through a hub aperture 115 (FIG. 2) formed at the center of central hub 116. A first annular flange 174 is disposed on main shaft 170 adjacent threaded end 176. First annular flange 174 abuts an inner surface of central hub 116, thereby preventing further passage of main shaft 170 through hub aperture 115. A threaded main shaft nut 177 engages threaded end 176 of main shaft 170 so that both axial and rotational motion of main shaft 170 relative to housing 110 is prevented. Main shaft 170 further includes an assembly head 172, a neck 173, and a second annular flange 178. Neck 173 is configured to releasably receive a portion of assembly pin 130 such that spool 120 is selectively secured to main shaft 170. Assembly head 172 is conically shaped so that merely pushing assembly head 172 against the assembly pin 130 causes assembly pin 130 to be displaced outwardly until assembly head 172 passes. Assembly pin 130 is spring biased inwardly so that it returns to its at rest position after the passage of assembly head 172, thereby engaging neck 173.

Figure 5:
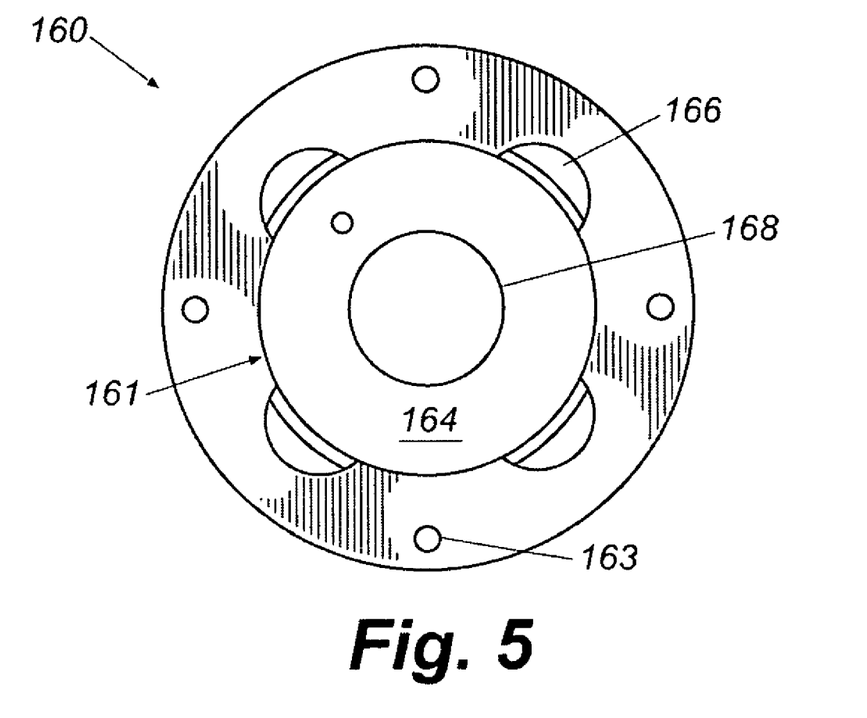
FIG. 5 is a right side elevational view of a drag housing of the fishing reel shown in FIGS. 1A and 1B.
Figure 6:
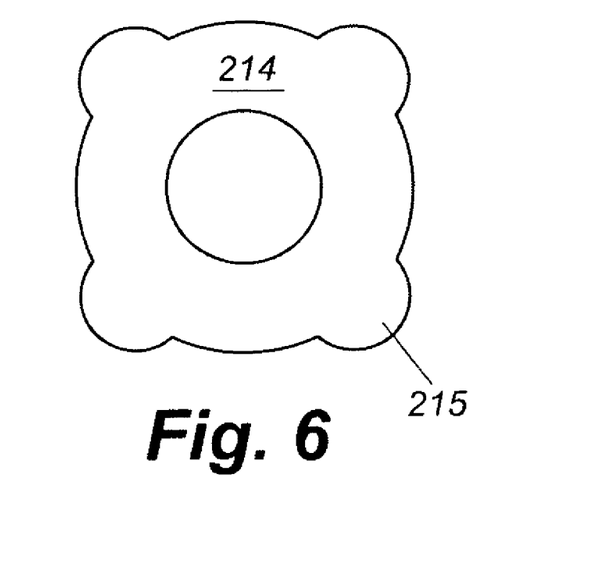
FIG. 6 is a right side elevational view of a drag washer of the fishing reel shown in FIGS. 1A and 1B.

A first recess 111 is formed on an inner surface of central hub 116 concentrically about hub aperture 115. A drag housing 160 is received in first recess 111 and secured to hub 116 by a plurality of screws 162. As best seen in FIG. 5, drag housing 160 defines a substantially cylindrical drag cavity 161 including a drag surface 164 formed by an inner wall of drag housing 160. Drag housing 160 further includes holes 163 for receiving screws 162, a central aperture 168 that is concentric to hub aperture 115, and lobed recesses 166 extending outwardly from drag cavity 161. A spool bushing 169 is press-fit to the outer circumference of drag housing 160 and reduces friction between spool 120 and housing 110 during rotation therebetween.

Prior to securing main shaft 170 to housing 110, a clutch sleeve 180 is positioned about main shaft 170. Clutch sleeve 180 includes a cylindrical bearing race 182 disposed near second annular flange 178 and a sleeve shaft 186 extending therefrom toward central hub 116 of housing 110. Sleeve shaft 186 is substantially cylindrical with the exception of a pair of lateral flats 187 formed opposite one another. A first bearing assembly 185 is received in an inner annular recess 184 of clutch sleeve 180 such that first bearing assembly 185 is disposed between clutch sleeve 180 and main shaft 170. A second bearing assembly 189 is received in a second recess 113 formed in central hub 116 so as to encircle an outer annular recess 188 formed in sleeve shaft 186. First bearing assembly 185 prevents direct contact of clutch sleeve 180 with main shaft 170 while second bearing assembly 189 prevents direct contact between clutch sleeve 180 and central hub 116 of housing 110. Preferably, clutch sleeve 180 does not contact main shaft 170 and first and second bearing assemblies 185 and 189 are self-contained ball bearing assemblies.

As shown, the drag assembly of fishing reel 100 includes a first friction washer 208, a first drag washer 210, a second friction washer 212, and a second drag washer 214. Washers 208, 210, 212 and 214 are disposed within drag cavity 161 about sleeve shaft 186 of clutch sleeve 180. Specifically, first friction washer 208 is disposed rotatably about sleeve shaft 186 between inner drag surface 164 and first drag washer 210. Second friction washer 212 is disposed rotatably about sleeve shaft 186 between first drag washer 210 and second drag washer 214, which is adjacent central hub 116 of housing 110. First drag washer 210 has an inner bore 218 with flat portions corresponding to the lateral flats 187 formed on sleeve shaft 186. As such, first drag washer 210 is non-rotatable with respect to clutch sleeve 180. As best seen in FIG. 5, second drag washer 214 includes outwardly extending lobes 215 corresponding to lobe recesses 166 of drag cavity 161. Therefore, second drag washer 214 is non-rotatable with respect to drag housing 160. Preferably, first and second drag washers 210 and 214 are constructed of steel while first and second fiction washers 208 and 212 are formed of suitable materials, such as Teflon®, Rulon®, oil impregnated felt, asbestos, leather, phenolic, or combinations of other materials.

The drag assembly of fishing reel 100 includes a drag knob 140 rotatably received in a knob recess 118 formed in an outer surface of central hub 116. Drag knob 140 is threadedly received on threaded end 176 of main shaft 170 that protrudes outwardly from central hub 116. Drag knob 140 is secured thereon by a lock screw 148 received in a threaded recess 179 formed in threaded end 176 of main shaft 170. Preferably, lock screw 148 and threaded recess 179 have a left-hand, or reverse, thread. A drag knob cap 142 is threadedly received in a recess formed in an outer surface of drag knob 140 to prevent the inadvertent loosening of lock screw 148. Rotation of drag knob 140 causes drag knob 140 to move axially along threaded end 176 of main shaft 170.

The reel preferably includes a suitable barrier (such as a seal) between drag knob 140 and recess 118 to inhibit ingress of extraneous material, such as dirt and water. In preferred embodiment, the barrier is formed by an O-ring 144 received in an annular groove 146 formed in the outer circumferential surface of drag knob 140. O-ring 144 contacts the inner cylindrical wall of knob recess 118 to help prevent the entry of foreign matter into the drag assembly of fishing reel 100.

A first washer 200, a bushing 203, a pin plate 204, and a plurality of drag clickers 152 are disposed within a cavity formed between central hub 116 and drag knob 140. Pin plate 204 includes a plurality of pins 206 spaced equally about its periphery and extending axially therefrom. Pin plate 204 is positioned adjacent central hub 116 such that each pin 206 extends inwardly into drag cavity 161 through a respective aperture 207 formed in central hub 116. Bushing 203 is disposed between pin plate 204 and first washer 200. First washer 200 includes an inner bore 202 that is correspondingly shaped to the hex-shaped outer surface of main shaft nut 177. As such, first washer 200 is non-rotatable about main shaft nut 177.

Each drag clicker 152 includes a clicker detent 154, a clicker spring 156, and a clicker bolt 158 which is received in a corresponding aperture 117 formed in central hub 116. Each clicker bolt 158 includes a recess configured to receive a corresponding clicker spring 156 and clicker detent 154 so that the detent may move fore and aft within the recess. Each clicker detent 154 engages an annular array of recesses 150 formed in the adjacent face of drag knob 140. As drag knob 140 is rotated in either direction, each detent 154 moves from one recess to the next, thereby causing a clicking sound.

As best seen in FIG. 2, spool 120 is formed by first and second spool portions 121a and 121b that are secured together by threaded fasteners to form a winding drum 134 about which fishing line is stored. The central hub of spool 120 includes a shaft recess 136, for receiving the distal end of main shaft 170 when the fishing reel is assembled, and a clutch bearing recess 138 for receiving a one-way clutch 190. One-way clutch 190 is non-rotatably received in clutch bearing recess 138 and retained therein by a retainer spring 192 received in an annular groove 193 formed adjacent to clutch bearing recess 138. When fishing reel 110 is assembled, one-way clutch 190 is configured to receive cylindrical bearing race 182 of clutch sleeve 180 so that spool 120 is rotatable with the respect to clutch sleeve 180 in only one direction. An annular array of axially-extending grooves 198 is formed on an inner surface of spool 120. Axially-extending grooves 198 cooperate with a spool clicker 194 secured to drag housing 160 by a screw 196 (see FIG. 3). Spool clicker 194 provides a clicking sound upon rotation of spool 120 relative to housing 110. Further, spool 120 includes a head cover 131 for covering pin 130 and assembly head 172 when spool 120 and housing 110 are assembled (FIG. 4).

Operation

To assemble fishing reel 100, assembly pin 130 is pivoted outwardly against spring bias and main shaft 170 of housing 110 is inserted into the central hub of spool 120 until assembly head 172 extends beyond assembly pin 130. With assembly head 172 so positioned, the user releases spring-biased assembly pin 130 which pivots inwardly so as to engage neck 173 rearwardly of assembly head 172. As noted, preferably, assembly head 172 is conically shaped so that assembly head 172 automatically urges assembly pin 130 outwardly as main shaft 170 is inserted into the central hub of spool 120. As best seen FIG. 4, when assembled, the distal end of main shaft 170 is positioned in shaft-recess 136 and cylindrical bearing race 182 of clutch sleeve 180 is disposed within one-way clutch 190.

Figure 4:
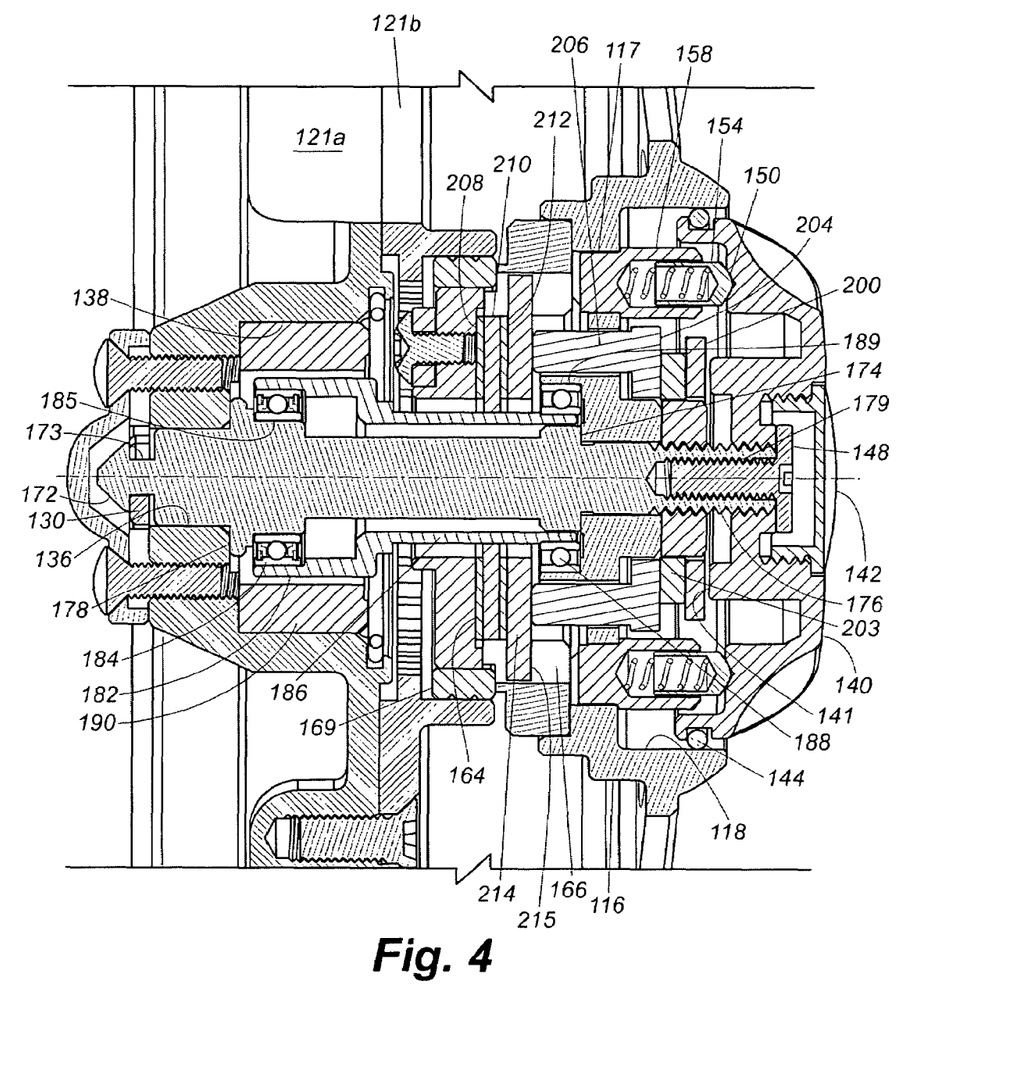
FIG. 4 is an enlarged partial cross-sectional view of the fishing reel shown in FIGS. 1A and 1B, taken along line 2—2.

Configured as shown in FIG. 4, the drag assembly of the fishing reel creates a minimal about of drag force in the fishing reel. More specifically, drag knob 140 is disposed in its outermost position relative to threaded end 176 of main shaft 170, as limited by lock screw 148. In this position, drag knob 140 exerts the minimum amount of axial force on the other components of the drag assembly. Preferably, in this position, a gap will exist between a cylindrical inner surface 141 of drag knob 140 and first washer 200 such that first drag washer 210, and thereby clutch sleeve 180, rotate freely with the respect to first and second fiction washers 208 and 212. This enables clutch sleeve 180 to rotate freely in either direction about main shaft 170. As such, with reference to FIG. 1A, a user may wind fishing line around winding drum 134 by rotating spool 120 in a clockwise direction 125, or unwind fishing line from winding drum 134 by allowing spool 120 to rotate in a counter-clockwise direction 127. One-way clutch 190 is configured such that spool 120 rotates freely about clutch sleeve 180 in clockwise direction 125, but is prevented from rotating about clutch sleeve 180 in counter-clockwise direction 127. Therefore, to unwind fishing line from winding drum 134, spool 120, and therefore clutch sleeve 180, must be rotatable about main shaft 170 in counter-clockwise direction 127.

In order to increase the drag force on fishing reel 100, a user rotates drag knob 140 in a clockwise direction 181 when viewing fishing reel 100 as shown in FIG. 1B. Rotation of drag knob 140 in clockwise direction 181 causes drag knob 140 to move axially inwardly along threaded end 176 of main shaft 170. Rotation of drag knob 140 also causes drag detents 154 to repeatedly engage and disengage individual recesses of circular array 150, thereby causing a clicking sound. Eventually, cylindrical inner surface 141 of drag knob 140 contacts first washer 200 and exerts increasing force in the axial direction along main shaft 170. In turn, first washer 200 exerts axial force on pin plate 204 through bushing 203. As increasing axial force is applied to pin plate 204, pins 206 are driven further into drag cavity 161. Drag pins 206 exert axial force on second drag washer 214 which is non-rotatable with the respect to drag housing 160 since lobes 215 interact with lobe recesses 166. As such, first friction washer 208, first drag washer 210, and second friction washer 212 encounter increased compressive force between second drag washer 214 and inner drag surface 164 of drag housing 160. Increased compressive force correlates to increased friction between first friction washer 208 and inner drag surface 164 and second friction washer 212 and a second drag washer 214. Subsequently, first and second friction washers 208 and 212 exert increased frictional force on first drag washer 210, which is non-rotatably fixed with respect to clutch sleeve 180. As frictional forces are increased on first drag washer 210, increased rotational force is required to rotate clutch sleeve 180 about main shaft 170.

As the amount of force required to rotate clutch sleeve 180 about main shaft 170 increases, the amount of force required to rotate spool 120 in counter-clockwise direction 127 relative to main shaft 170 increases correspondingly. As such, increased force is required to unwind fishing line from winding drum 134. This is because one-way clutch 190, which is non-rotationally fixed to spool 120, prevents the rotation of spool 120 in counter-clockwise direction 127 relative to clutch sleeve 180 (FIG. 1A). Therefore, the amount of force required to rotate spool 120 in counter-clockwise direction 127 is proportional to the amount of force required to rotate clutch sleeve 180 in counter-clockwise direction 127 about main shaft 170. However, one-way clutch 180 rotates freely in clockwise direction 125 about cylindrical bearing race 182 of clutch sleeve 180 regardless of the amount of drag force applied to fishing reel 100 by the drag assembly. Rotation of spool 120 in clockwise direction 125 is thus unrelated to the amount of drag force present in the fishing reel 100.

Preferably, the drag assembly is capable of exerting enough frictional force on first drag washer 210 such that rotation of clutch sleeve 180 about main shaft 170 can be effectively prevented, regardless of the amount of rotational force applied. In this state, it is possible to wind fishing line onto winding drum 134, but the unwinding of fishing line therefrom is prevented. To once again allow fishing line to be unwound from winding drum 134, a user rotates drag knob 140 in a counter-clockwise direction 183, when fishing reel 100 is viewed as shown in FIG. 1B. As drag knob 140 is rotated in counter-clockwise direction 183, drag knob 140 moves outwardly from central hub 116 as it travels along threaded end 176 of main shaft 170. As drag knob 140 moves outwardly, the amount of axial force exerted by drag knob 140 on the remaining components of the drag assembly decreases. Reduced axial force leads to reduced fictional forces being exerted on first drag washer 210 and the subsequent ability of clutch sleeve 180 to rotate more freely about main shaft 170.

While preferred embodiments of the invention have been shown and described, modifications and variations thereto may be practiced by those of ordinary skill in the art without departing from the spirit and scope of the present invention, which is more particularly set forth in the appended claims. In addition, it should be understood the aspects of the various embodiments may be interchanged both in or in part without departing from the scope of the present invention. Furthermore, those of ordinary skill in the art will appreciate that the foregoing description is by way of example only, and is not intended to limit the invention as further described in such appended claims.

What is claimed is:

1. A fishing reel comprising:
   a housing having a central hub;
   a main shaft having a proximal end and a distal end, said main shaft being non-rotatably fixed to said central hub at said proximal end;
   a spool having a central recess, said spool being releasably secured to said main shaft distal end;
   a one-way clutch having a central bore, said one-way clutch being non-rotatably received in said central recess;
   a drag assembly comprising;
   a drag housing having a drag surface and a central aperture, said drag housing being fixed to said central hub of said housing such that a drag cavity is formed therebetween;
   a sleeve extending along said main shaft and having a first portion received in said central bore of said one-way clutch and a second portion extending into said drag cavity;
   a first drag washer disposed in said drag cavity and non-rotatably located on said second portion of said sleeve;
   a rotatable drag knob; and
   wherein rotation of said drag knob in a first direction urges said first drag washer axially along said sleeve toward said drag surface and increases rotational frictional force on said first drag washer, and rotation of said drag knob in a second direction reduces rotational frictional force exerted on said first drag washer.

2. The fishing reel of claim 1, further comprising a first bearing assembly disposed between said first portion of said sleeve and said main shaft.

3. The fishing reel of claim 2, further comprising a second bearing assembly disposed between said second portion of said sleeve and said housing.

4. The fishing reel of claim 3, wherein said first and second bearing assemblies further comprise ball bearing assemblies.

5. The fishing reel of claim 1, further comprising a second drag washer disposed in said drag cavity between said first drag washer and said drag knob, said second drag washer being rotatable with respect to said sleeve and non-rotatable with respect to said drag housing.

6. The fishing reel of claim 5, wherein said second drag washer has at least one protrusion engaging a corresponding recess defined in said drag cavity.

7. The fishing reel of claim 5, further comprising a pin plate including at least one pin extending therefrom, said pin plate being adjacent said housing such that said pin extends into said drag cavity.

8. The fishing reel of claim 7, further comprising:
   a threaded portion on said proximal end of said main shaft; and
   wherein said drag knob is threadedly received on said threaded portion of said main shaft and rotation of said drag knob in said first direction causes said drag knob to move axially along said main shaft, thereby urging said at least one pin further into said drag cavity.

9. The fishing reel of claim 8, wherein said pin plate further includes a plurality of pins spaced evenly about a periphery thereof.

10. The fishing reel of claim 5, wherein rotation of said drag knob in said first direction urges said second drag washer toward said drag surface such that a compressive force exerted on said first drag washer is increased.

11. The fishing reel of claim 10, further comprising:
    a threaded portion on said proximal end of said main shaft; and
    wherein said drag knob is threadedly received on said threaded portion of said main shaft.

12. The fishing reel of claim 1, wherein a cross-sectional shape of said second portion of said sleeve is complimentary in shape to an inner aperture of said first drag washer.

13. The fishing reel of claim 1, further comprising:
    a knob recess formed in said hub and being coaxial with a longitudinal center axis of said main shaft, said knob recess including a cylindrical inner wall; and
    wherein said drag knob is received in said knob recess.

14. The fishing reel of claim 13, further comprising a barrier located between said drag knob and said cylindrical inner wall of said knob recess in order to prevent ingress of extraneous material.

15. The fishing reel of claim 14, wherein an annular groove is formed in an outer surface of said drag knob and said barrier comprises an O-ring received in said annular groove, said O-ring contacting said cylindrical inner wall along its length.

16. The fishing reel of claim 1, wherein said drag surface of said drag housing is disposed in said drag cavity.

17. The fishing reel of claim 1, wherein said one-way clutch and said sleeve rotate with respect to each other in a single direction.

18. A fishing reel comprising:
    a housing having a central hub;
    a main shaft having a proximal end and a distal end, said main shaft being non-rotatably fixed to said central hub at said proximal end;
    a spool rotatable about said main shaft;
    a drag housing having a drag surface and a central aperture, said drag housing being fixed to said central hub of said housing such that a drag cavity is formed therebetween;
    a sleeve extending along said main shaft and having a first end adjacent said distal end of said main shaft and a second end extending into said drag cavity and adjacent said central hub;
    a first bearing assembly disposed between said first end of said sleeve and said distal end of said main shaft;
    a second bearing assembly disposed between said second end of said sleeve and said central hub of said housing;
    a first drag washer disposed in said drag cavity and non-rotatably located on said sleeve; and
    wherein axial movement of said first drag washer along said sleeve varies rotational frictional force between said first drag washer and said drag surface of said drag housing.

19. The fishing reel of claim 18, wherein said first and second bearing assemblies further comprise ball bearing assemblies.

20. The fishing reel of claim 18, further comprising:
a central recess formed in said spool;
a one-way clutch having a central bore, said one-way clutch non-rotatably received in said central recess; and
wherein a portion of said shaft is received in said central bore of said one-way clutch such that said sleeve is rotatable in only one direction with respect to said one-way clutch.

21. The fishing reel of claim 18, further comprising:
a threaded portion on said proximal end of said main shaft; and
wherein said fishing reel further includes a drag knob threadedly received on said threaded portion of said main shaft.

22. The fishing reel of claim 21, further comprising:
a knob recess including a cylindrical inner wall formed in said central hub of said housing, said knob recess being coaxial with a longitudinal center axis of said main shaft;
an annular groove formed in an outer surface of said drag knob;
an O-ring received in said annular groove; and
wherein said drag knob is rotatably received in said knob recess and said O-ring contacts said cylindrical inner wall along its length.

23. A fishing reel comprising:
a housing having a central hub with a knob recess formed therein, said knob recess including a cylindrical inner wall;
a main shaft having a proximal end and a distal end, said main shaft being non-rotatably fixed to said central hub at said proximal end;
a spool having a central recess;
a one-way clutch having a central bore, said one-way clutch being non-rotatably received in said central recess;
a drag knob rotatably received in said knob recess;
a barrier located between said drag knob and said cylindrical inner wall of said knob recess in order to prevent ingress of extraneous material;
a drag assembly including at least one drag washer contained within a drag housing fixed to said central hub of said housing, said drag housing defining a central aperture; and
said drag assembly further including a sleeve extending along said main shaft and having a first portion received in said central bore of said one-way clutch and a second portion extending into said drag cavity.

24. The fishing reel of claim 23, wherein an annular groove is formed in an outer surface of said drag knob and said barrier comprises an O-ring received in said annular groove, said O-ring contacting said cylindrical inner wall along its length.

25. The fishing reel of claim 23, further comprising a first bearing assembly disposed between said first portion of said sleeve and said main axle.

26. The fishing reel of claim 25, further comprising a second bearing assembly disposed between said second portion of said sleeve and said housing.

27. The fishing reel of claim 26, wherein said first and second bearing assemblies further comprise ball bearing assemblies.

28. The fishing reel of claim 23, wherein said at least one drag washer comprises first and second drag washers, said second drag washer disposed in said drag cavity between said first drag washer and said drag knob, said second drag washer being rotatable with respect to said sleeve and non-rotatable with respect to said drag housing.

29. A fishing reel comprising:
a housing;
a nonrotatable main shaft fixed to said housing;
a spool rotatable about said main shaft, said spool including a one-way clutch having a central bore;
a sleeve located coaxial to and extending along said main shaft, said sleeve being supported for rotation by first and second bearing assemblies;
said first bearing assembly having an inner race fixed with respect to said main shaft and an outer race fixed with respect to an inner surface of said sleeve;
said second bearing assembly having an inner race fixed with respect to an outer surface of said sleeve and an outer race fixed with respect to said central hub;
at least one drag washer non-rotatably located on said sleeve; and
an end of said sleeve adjacent said first bearing assembly being received in said one-way clutch.

* * * * *